US012202168B2

(12) United States Patent
Ojalainen

(10) Patent No.: US 12,202,168 B2
(45) Date of Patent: Jan. 21, 2025

(54) CONDITIONING SYSTEM FOR WOOD PROCESSING AND A METHOD THERETO

(71) Applicant: Raute Oyj, Nastola (FI)

(72) Inventor: Jussi Ojalainen, Lahti (FI)

(73) Assignee: Raute Oyj, Nastola (FI)

( * ) Notice: Subject to any disclaimer, the term of this patent is extended or adjusted under 35 U.S.C. 154(b) by 1073 days.

(21) Appl. No.: 16/973,460

(22) PCT Filed: Jun. 7, 2019

(86) PCT No.: PCT/FI2019/050439
§ 371 (c)(1),
(2) Date: Dec. 9, 2020

(87) PCT Pub. No.: WO2019/239007
PCT Pub. Date: Dec. 19, 2019

(65) Prior Publication Data

US 2021/0247136 A1 Aug. 12, 2021

(30) Foreign Application Priority Data

Jun. 13, 2018 (FI) .................................... 20185537

(51) Int. Cl.
*B27K 1/02* (2006.01)

(52) U.S. Cl.
CPC ............ *B27K 1/02* (2013.01); *F26B 2210/16* (2013.01)

(58) Field of Classification Search
CPC .......... B27K 1/02; F26B 2210/16; F26B 9/06; F26B 21/02; F26B 21/08; G05D 22/00; G05D 22/02
See application file for complete search history.

(56) References Cited

U.S. PATENT DOCUMENTS 1,494,536 A * 5/1924 Fish, Jr. .................. B27K 1/02 202/96
1,631,532 A * 6/1927 Howerton ................ B27K 3/10 118/421
2,523,322 A 9/1950 Ornstein et al.
3,148,955 A 9/1964 Nichols
(Continued)

FOREIGN PATENT DOCUMENTS

CN 101561216 A 10/2009
CN 202303747 U 7/2012
(Continued)

OTHER PUBLICATIONS

Finnish Office Action issued Aug. 13, 2022, in corresponding Finnish Patent Application No. 20185537, 6 pages.
(Continued)

*Primary Examiner* — Marc E Norman
(74) *Attorney, Agent, or Firm* — Meunier Carlin & Curfman LLC

(57) ABSTRACT

The invention relates to a wood conditioning system comprising: a first chamber; a second chamber; at least one air conveyor device for circulating air between the first chamber and the second chamber; the second chamber comprising at least one device for spraying water substantially against a direction of the circulated air. Some aspects of the invention relate to a method for wood conditioning.

12 Claims, 3 Drawing Sheets

(56) References Cited

U.S. PATENT DOCUMENTS

| | | | | | |
|---|---|---|---|---|---|
| 3,151,850 | A * | 10/1964 | Wellford, Jr. | ........... | F26B 23/02 236/44 R |
| 3,614,074 | A | 10/1971 | Wellford, Jr. | | |
| 4,280,284 | A * | 7/1981 | Guthrie | .................... | B27K 1/02 34/380 |
| 2018/0087838 | A1 | 3/2018 | Kolari | | |

FOREIGN PATENT DOCUMENTS

| | | | |
|---|---|---|---|
| JP | S5369898 | A | 6/1978 |
| JP | H04306479 | A | 10/1992 |
| JP | 2013228136 | A | 11/2013 |
| RU | 2080532 | C1 | 5/1997 |
| WO | 0249818 | A1 | 6/2002 |
| WO | 2009153842 | A1 | 12/2009 |
| WO | 2018033665 | A1 | 2/2018 |

OTHER PUBLICATIONS

Finnish Office Action issued Aug. 13, 2021, in priority Finnish Patent Application No. 20185537, 6 pages.

Search results under rule 164(2)(b) EPC from European Patent Office in regards with corresponding application EP19731318 dated on Mar. 2, 2023 2p.

* cited by examiner

CONDITIONING SYSTEM FOR WOOD PROCESSING AND A METHOD THERETO

This application is a U.S. national application of the international application number PCT/FI2019/050439 filed on Jun. 7, 2019 and claiming priority of FI application No. 20185537 filed on Jun. 13, 2018, the contents of all of which are incorporated herein by reference.

TECHNICAL FIELD

The invention concerns in general the technical field of wood processing. More particularly, the invention concerns conditioning of wood material for wood processing.

BACKGROUND

Manufacturing of wood products is a sophisticated process in which a plurality of production related parameters shall be taken into account in order to achieve an efficient manufacturing process. One area of interest is a preparation of the wood material, such as logs, optimally for producing the wood product in ques-tion. For example, the manufacturing process itself may require that the wood material is prepared so that its processing is possible and that the manufacturing process is efficient e.g. from a yield point of view. The preparation of the wood material is also important in a sense that the wood may be icy or molten being dependent on a season and a location in a geographical sense.

The above-described framework e.g. applies in a ply and veneer production wherein a preparation of wood material plays an essential role in the production. In the production of ply and veneer logs are peeled with a lathe to generate thin continuous sheet of wood for further processing. The peeling may be performed optimally if the logs, or similar wood material, are heated at a certain temperature. Advantageously, a moisture of the logs is also set optimally. The term used at least in the context of ply and veneer production for the preparation of logs as described is conditioning of the logs.

There is developed several methods for conditioning the wood material for the ply or veneer production. A first known conditioning method is that the logs are sunk in a basin filled with a water optimally heated for the conditioning. A second known conditioning method is based on a generation of steam to a chamber into which the logs are carried to. The steam is also heated so that the heat may be transferred to the logs in the chamber. A third known conditioning method is that a combined water spraying and steaming is applied to the logs which improves the heat transfer, but also a greater moisture ratio may be achieved in the logs. Generally speaking the solutions based on a utilization of steam are usually more optimal than the method in which the logs are sunk in a water basin because moisture distribution is more uniform. Besides the sinking of the logs in water basin may cause that the logs are too wet for further processing and generates a lot of waste mostly originating from the logs in the basin, but also to other devices in the production chain.

FIG. 1 provides an example of a system as described in a document WO 02/49818 A1 in which the conditioning method is based on the generation of steam in a chamber 110 into which logs 115 carried e.g. by a trolley 120 may be brought in. A water basin 125, such as a trough, is arranged in the chamber 110. The water basin 125 is equipped with heat exchanger element 130 into which steam is provided from a boiler 135. This causes a generation of steam, at a high temperature, by the water basin 125 in the chamber for conditioning the logs for wood processing. Now, the steam generated by the water basin 125 condensates upon the logs 115 and the heat is transferred to the logs 115. The condensated water on the logs 115 drops down due to the effect of gravity and it is collected in a collector 140 and conveyed to the water basin 125 with a pump 145 and in that manner a closed-loop system may be implemented.

All the above-described conditioning methods have their advantages and disad-vantages. However, all the methods consume huge amounts of energy in a form of heating the water, in one form or another, to a high temperature. Additionally, some of them generate a great amount of sewage which need to be treated for environmental reasons. Hence, there is need to develop solutions in which energy aspects are taken into account so that the drawbacks in the existing solutions may be mitigated at least in part.

SUMMARY

The following presents a simplified summary in order to provide basic under-standing of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a wood conditioning system and a method for conditioning wood for optimizing energy utilization in a wood product manufacturing process. Another objective of the invention is that the wood conditioning system and the method enable a utilization of a secondary energy in the conditioning.

The objectives of the invention are reached by a wood conditioning system and a method as defined by the respective independent claims.

According to a first aspect, a wood conditioning system is provided, the wood conditioning system comprising: a first chamber; a second chamber; at least one air conveyor device for circulating air between the first chamber and the second chamber; the second chamber comprising at least one device for spraying water substantially against a direction of the circulated air.

The second chamber may be configured so that the at least one device for spraying water is positioned so as to cause the sprayed water to drip down whereas the circulated air is conveyed substantially against the direction of the sprayed water.

Furthermore, the at least one device 240 for spraying water may comprise a number of water nozzles.

The at least one device for spraying water may be configured to spray the water at different levels in a vertical direction of the second chamber substantially against the direction of the circulated air.

In the wood conditioning system the water sprayed with the at least one device may be warmer than the air received in the second chamber from the first chamber.

Still further, the at least one device for spraying water may be configured to receive at least part of the water from a device external to the wood conditioning system. For example, the device external to the wood conditioning system may be a scrubber device.

The device for spraying water may be configured to receive the water to be output from the next device for spraying water in a wood conditioning system comprising a plurality of the devices for spraying water in the second chamber.

The second chamber may also comprise filling material towards which at least a portion of the water is configured to be sprayed.

The wood conditioning system may further comprise a droplet separator. For example, the droplet separator may be positioned in the system so that the circulated air travels through the droplet separator when output from the second chamber towards the first chamber.

According to a second aspect, a method for conditioning wood with a wood conditioning system (200) is provided, the wood conditioning system comprising: a first chamber; a second chamber; the method comprising: circulating air between the first chamber and the second chamber with at least one air conveyor device; and spraying water substantially against a direction of the circulated air with at least one device arranged in the second chamber.

The water may be sprayed at different levels in vertical direction of the second chamber substantially against the direction of the circulated air.

Moreover, at least part of the water may be received from a device external to the wood conditioning system. The water received from the device external to the wood conditioning system may be heated with a secondary energy obtained from another stage of a wood processing system.

The method may further comprise a step of separating at least part of water droplets from the circulated air with a droplet separator.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
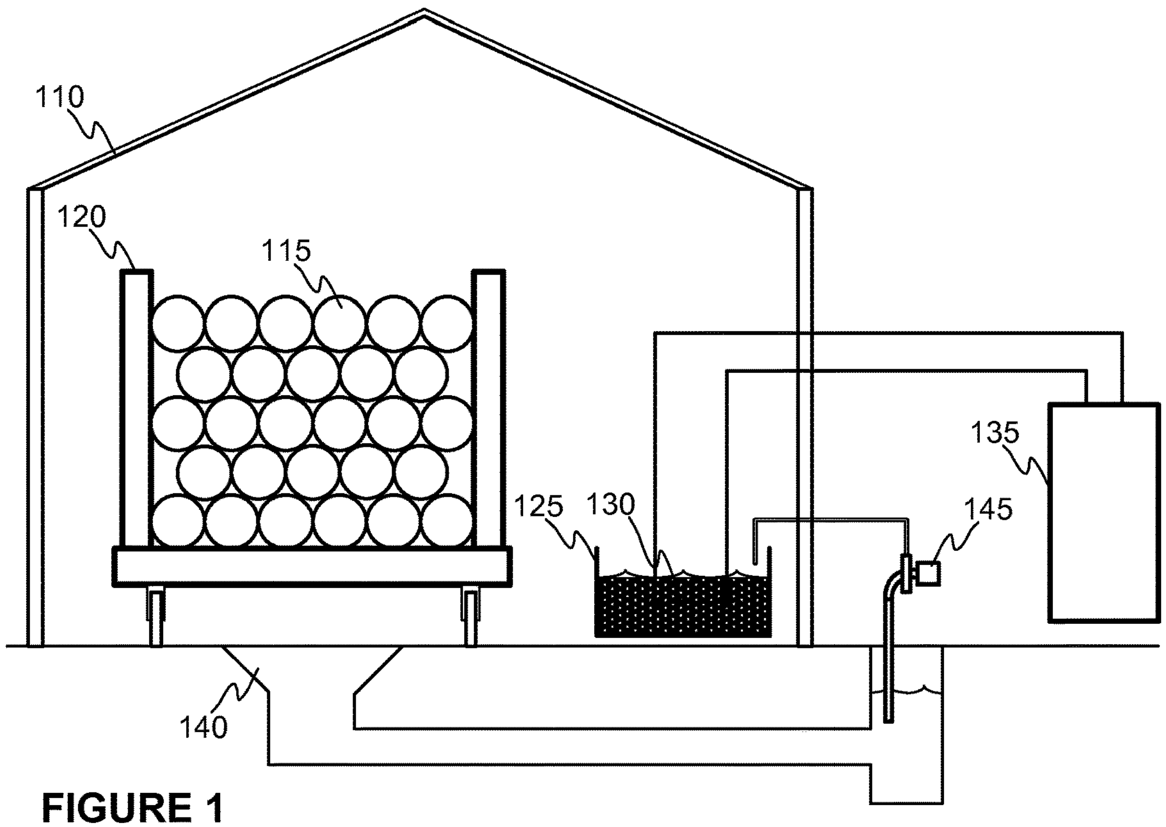
FIGURE 1 Prior Art
FIG. 1 illustrates schematically a wood conditioning system according to prior art.
Figure 2:
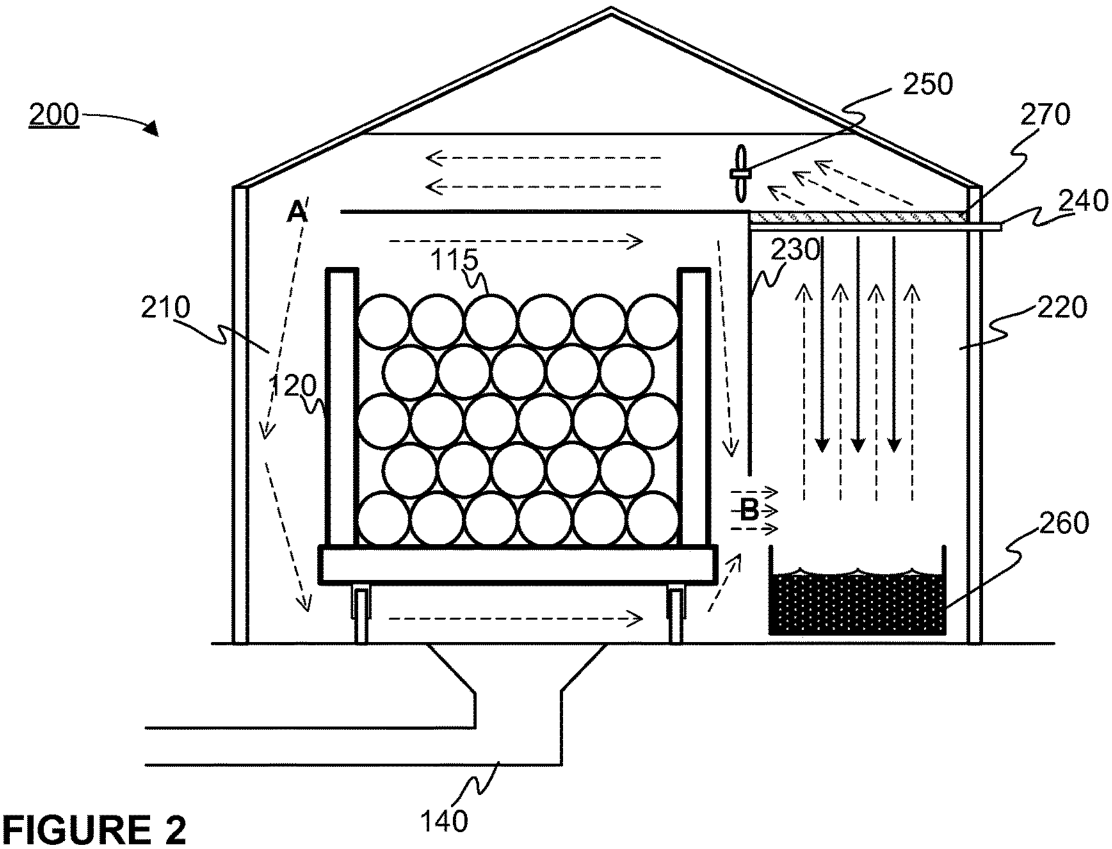
FIG. 2 illustrates schematically an example of a wood conditioning system according to an embodiment of the invention.

FIG. 2 illustrates schematically an example of a wood conditioning system according to an embodiment of the present invention. The wood conditioning system comprises a chamber consisting of a first chamber 210 and a second chamber 220. The first chamber 210 and the second chamber 220 may be separated with a wall 230 from each other. The wall 230 may be implemented so that it forms at least two openings for the first chamber 210. The openings are referred with A and B in FIG. 2. The first chamber refers to a space into which logs 115 to be conditioned may be brought in e.g. by means of a trolley 120. The trolley 120 may e.g. be configured to travel on rails. The second chamber 220, in turn, may be configured to heat up an air circulated in the wood conditioning system. Concurrently, the air may also be humidified in a manner as will be described. Hence, the term 'air' refers to a gas compound comprising a plurality of different gases together with water vapor as well as possibly water droplets carried by the air. A direction of the circulated air in the wood conditioning system is indicated with arrows drawn with dashed lines in FIG. 2. The second chamber 220 may also be equipped with a device 240 configured to provide water substantially against the direction of the circulated air.

In the embodiment of the present invention, as schematically illustrated in FIG. 2, the device 240 providing the water is configured to spray the water through water nozzles in the second chamber 220, wherein the water drips down due to nozzle velocity and an effect of gravity substantially against the circulated air. In FIG. 2 the direction of the water in the second chamber 220 is indicated with arrows directed downwards. In a preferred embodiment of the present invention the device 240 is configured to generate water in a form of water drops. The provided water in the second chamber 220 interacts with the circulated air as will be described for enabling the conditioning of the logs 115 and the air travels over the device 240 and e.g. through a droplet separator 270 which is configured to divert at least part of droplets from the air flow. Moreover, the separation of the droplets from the air also reduces a contamination of the water used in the system because only an optimal amount of water is conveyed, in the air, to the first chamber 210 wherein the water gets dirty. The air ends up to a channel through which the air may be conveyed to the first chamber 210. The channel may be equipped with a number of air conveyor devices 250, such as one or more fans, which are configured to generate a force for conveying the air through the wood conditioning system in response to controlling the air conveyor device 250 to operate accordingly. For sake of clarity, it is worthwhile to mention that the air may be input through an opening referred with A in FIG. 2 to the first chamber 210 and output through the opening referred with B from the first chamber 210 to the second chamber 220. Hence, the air travels in the first chamber 210 so that a heat accumulated in the humid air transfers to the logs 115 brought in the first chamber 210 in an efficient way. In some embodiments of the invention, air conveyor devices 250 may be arranged to a plurality of locations within the air path. For example, at least one of the openings A or B may be equipped with the air conveyor device 250, such as a fan, so that the air travels through the fan when input/output to the second chamber 210/from the second chamber 210. The wood conditioning system may also comprise a collection basin 260 for receiving at least part of the water output by the device 240 and for providing storage, such as in a temporal basis, for conveying the water to other entities. Moreover, the wood conditioning system 200 may comprise a collector 140 for collecting the water from the first chamber 210 for conveying it to cleaning device and therefrom back to the system e.g. through a heating stage. The wood conditioning system may comprise further devices and entities not shown in FIG. 2.

Figure 3:
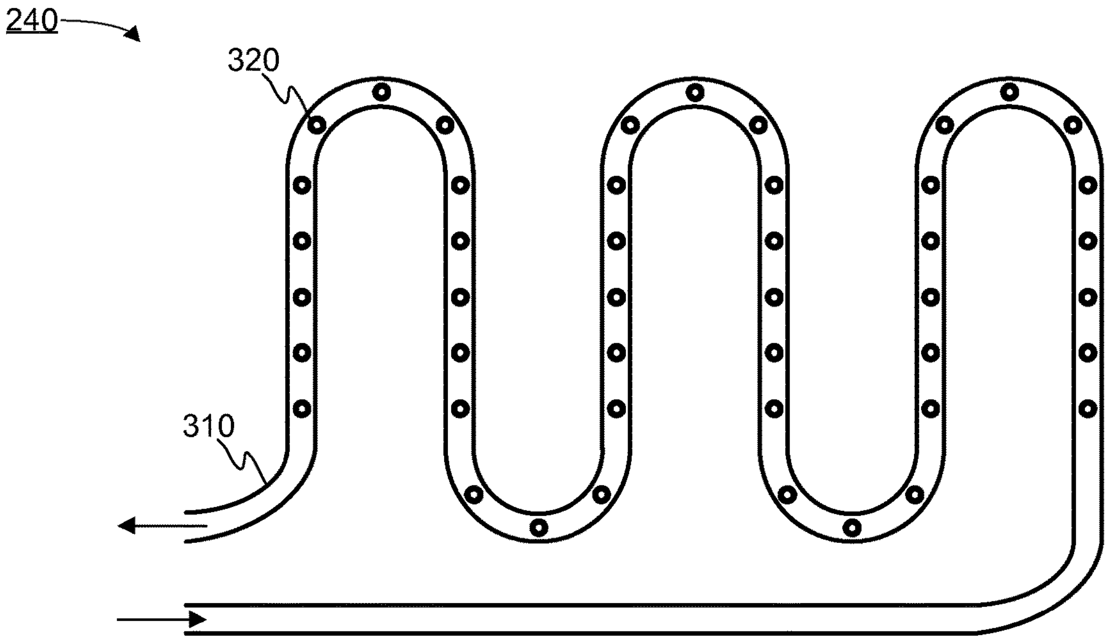
FIG. 3 illustrates schematically an example of a device belonging to the wood conditioning system according to an embodiment of the invention.

For describing at least some aspects of the present invention in more detail it is here referred to FIG. 3 illustrating a non-limiting example of the device 240 which is configured to provide water substantially against the direction of the circulated air in the second chamber 220. The device 240 according to the example may be implemented with a pipe 310 into which a plurality of nozzles 320 are arranged. In FIG. 3 only one nozzle is provided with the reference 320 to maintain a clarity in FIG. 3. The water is input from one end of the tube 310 and output from the other end or alternatively it may be arranged that water is input from one end of the tube 310 but the other end is closed. The nozzles 310 may be mounted to holes processed in the tube. The number and positions of the nozzles in the embodiment of FIG. 3 are non-limiting examples and they are at least in part dependent on a type of the nozzles used. In other words, different types of nozzles generate nozzle type specific spraying pattern which may have effect on the number of the nozzles and the positions of them. In an advantageous implementation of the present invention the number of nozzles and their positions are selected so that the device 140 is suitable for forming a uniform water spraying downwards over a cross section of the second chamber 220. For example, an applicable nozzle type, in at least some application area, may be such which generate water droplets having an average diameter of 0.1-2 mm if no filling material is used in the second chamber 220. If filling material is used in the second chamber 220, the average diameter of the water droplets generated by the nozzles 320 may be larger. Generally speaking the filling material may be used for enhancing heat and humidity transfer from the water droplets to the circulated air. This is due to an increased surface area for transferring the heat and humidity, because when the water droplets collide the filling material, the droplets break to smaller droplets and at the same time the temperature gradients of the water droplets are lost which also enhances the heat and the humidity transfer. As non-limiting examples of the filling structures may be mentioned so called film-fill structure, trickle fill structure and splash-fill structure. However, any applicable structure, such as the filling is implemented with plastic pellet or pieces of tubes arranged in the chamber 220. In other words, at least a part of the second chamber 220 may be filled with the filling material.

Furthermore, as a non-limiting example of an embodiment of the invention the water flow provided in the second chamber 220 may be arranged to flow at a speed of 0.2-10 m/s whereas the air flow in the second chamber 220 may happen at a speed of 0.5-7 m/s. The given speeds are defined with respect to a static or fixed point, or layer, in the second chamber 220. With these kinds of parameters the air may be humified for the purpose of the present invention to conditioning wood.

It is worthwhile to mention that even if the implementation discussed above and as illustrated in the figures refer to that in which the device 240 is arranged so that it provides the water directly against the circulated air, the provision of the water may also be implemented so that at least part of the water nozzles of the device 240 are implemented on at least one of the walls of the second chamber 220. For example, they may be implemented so that they may provide water diagonally downwards against the circulated air.

The size of the second chamber may vary according to an application area. In some embodiment the width in the cross-sectional direction of FIG. 2 may e.g. be 0.5-2.5 m. However, the inventive idea does not limit the size of the second chamber anyhow in a technical sense.

As described above the operation of the wood conditioning system according to the present invention is based, at least in part, to an inventive idea how the second chamber 220 is implemented to operate. Namely, a temperature of the water injected, or sprayed, substantially against the circulated air is advantageously warmer than a temperature of the air. More specifically, at a surface temperature of the water droplets is warmer than the temperature of the air. Additionally, a partial pressure of water vapor, i.e. steam, on the surface of the water droplet is higher than a partial pressure of the water vapor, i.e. steam, in the air. This causes water to vaporize to the air heating the air up at the same time. As a consequence, the absolute humidity of the air may also be increased together with the increased temperature.

Further, when the humified air, i.e. water saturated air, reaches the logs 115 brought in in the second chamber 220, the humidity of the air condensates on surfaces of the logs 115 from the saturated air and in that manner transfers the heat to the logs 115. As a result, the water condensated on the log surface starts flowing downwards concurrently transferring heat to the logs 115 being in the path of the flowing water. Generally speaking, the humidity of the air in a conditioning state according to the present invention may be 100%, or at least close to that. Fundamentally thinking, the maximum temperature of the conditioning is a boiling temperature of the water under the air pressure in the chamber. In practice, the conditioning temperature is, however, below the temperature of the water provided in the second chamber 220.

The described solution causes the air traveling along the stack of logs 115 but also a portion of air travels in gaps between the logs 115 in the stack. This also enhances the conditioning of the wood in the manner as described. In some embodiment of the invention the wood conditioning system may be implemented so that the logs 115 may be brought in in the first chamber 210 so that their longitudinal direction is transverse to the direction of the motion of the logs 115 on the trolley 120. As a result, the longitudinal direction of the logs 115, and, hence, the direction of the gaps, is at least partially parallel to the direction of the air flow in the first chamber 210 when the air is brought in through the opening A and output through the opening B. This enhances the flow of air, and, hence, the conditioning of the wood.

The flow of air through the gaps of the logs 115 is also enhanced due to a decrease of air volume as a result of the condensation of the water on the surfaces of the logs 115. The underpressure generated in response to the decrease of the air volume especially in the gaps between the logs 115 may also enhance the air flow of the warmer air brought in in the first chamber 210 to the gaps.

As discussed above the water applied to the air in the second chamber 220 is advantageously warmer than the air in order to achieve the effect as described and the solution as described enables a mitigation of the drawbacks of the prior art solution. This is especially true because the temperature of the water may be maintained moderate with the present invention compared to the prior art solutions.

The present invention also enables a utilization of secondary energy obtainable from another stage of the wood processing system for heating the water output with the device 240. This is possible at least in part for the reason that the water temperature may be maintained moderate, as mentioned above. For example, a drying stage of the wood processing system, e.g. in a ply or veneer manufacturing, generates air into which water is vaporized. By separating the water from the air generated at the drying stage it is possible to receive water at a temperature of 60-90 degrees Celcius (° C.) that may be directly input, and, thus, used in the wood conditioning system according to an embodiment of the present invention. In other words, the water may be input to the device 240 and sprayed out in the manner as described. In some embodiment of the invention the device 240 may be implemented so that device 240 comprises a plurality of sub-devices arrangeable on different vertical levels in the second chamber 220. The spraying of water may also be controlled between the different levels in differing phases so that an optimal outcome may be achieved. For example, the spraying in the differing phases at the different levels mitigates an effect of temperature gradients established in the water droplets.

Figure 4:
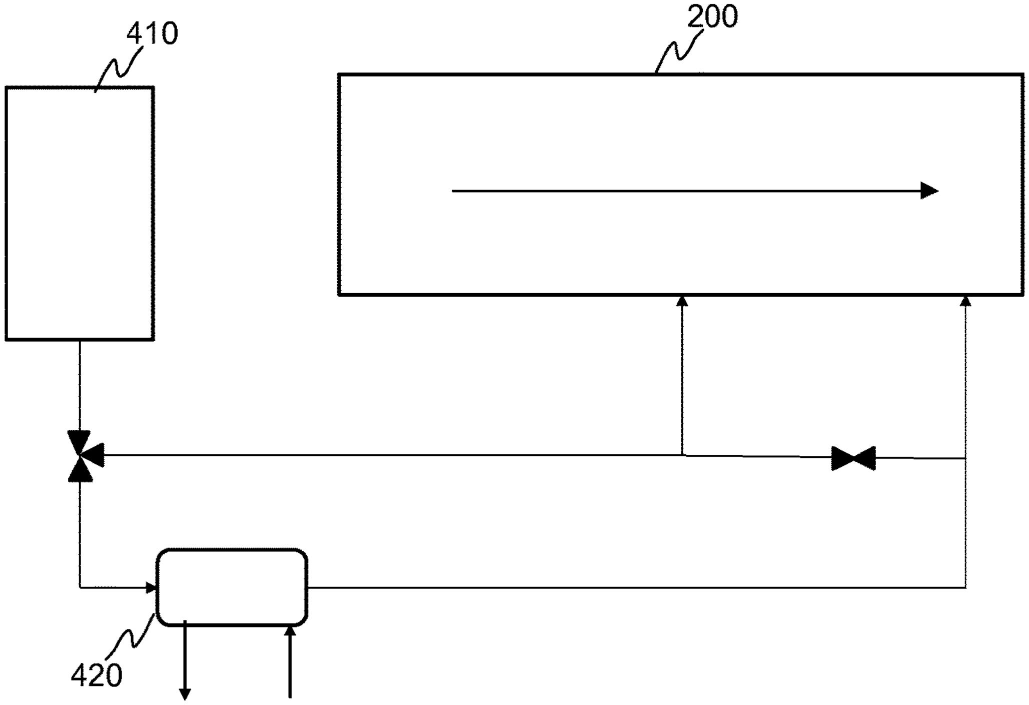
FIG. 4 illustrates schematically a portion of a wood processing system applying the wood conditioning system according to an embodiment of the invention.

FIG. 4 illustrates schematically a portion of a wood processing system in which a wood conditioning system according to an embodiment of the present invention is applied (referred with 200). The direction of motion of the logs 150 within the conditioning system 200 is indicated with the arrow. The wood conditioning system is configured to receive at least part of the water to be provided by a device 240 substantially against the direction of air flow from another stage of the wood manufacturing process, which may e.g. be a drying stage from which the exhaust gas is directed e.g. to so-called scrubber device 410 which separates at least a part of the water from the gas and the separated hot water is directed to the wood conditioning system. In some embodiment the water may be directed to the wood conditioning system through a heat exchanger 420 which may be arranged in the water path for controlling the temperature of the water in an optimal way. The heat exchanger 420 may output condensated water and take steam in from another source, such as from a boiler. At least a portion of the hot water may be temporarily stored in an applicable buffer, such as in a water storage tank. The scrubber device 410 may also receive the cold water from the wood conditioning system 200 to be heated again with the scrubber 410, and also with the heat exchanger 420.

Figure 5:
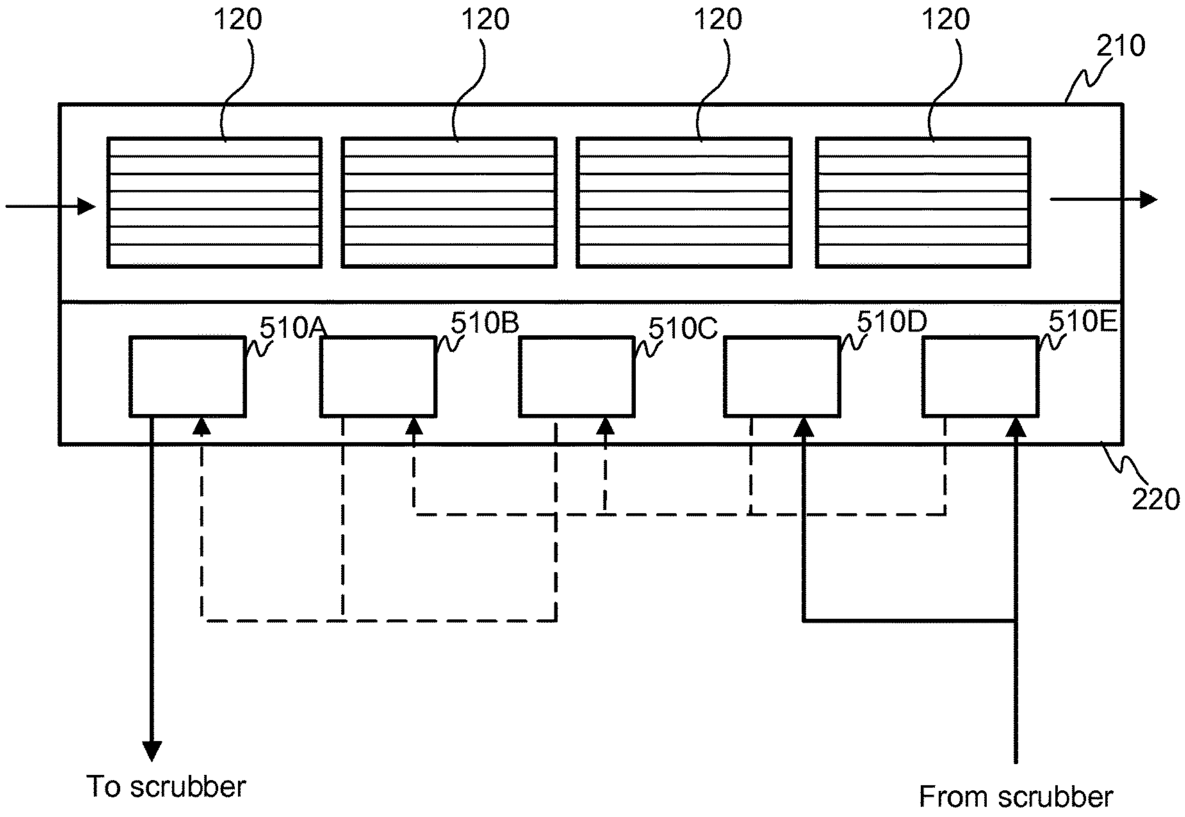
FIG. 5 illustrates schematically a further embodiment of the invention.

FIG. 5 illustrates schematically a further embodiment of the present invention in which the wood conditioning system comprises a first chamber 210 and a second chamber 220. The first chamber 210 has dimensions which enable a plurality of trolleys 120 to enter the first chamber 210 concurrently. In order to enable heating of the logs 115 in efficient manner in such an environment the second chamber 220 is configured with a plurality of cells 510A-510E in which the heating of air in the manner as described is arranged. According to an embodiment each cell 510A-510E comprise a device for generating the water droplets for dropping them down substantially against an air having a temperature less than the temperature of the water. In the embodiment as schematically illustrated in FIG. 5 the hot water from a scrubber, for example, is input to a cell 510E, or a number of cells 510D, 510E, locating at the end of the first chamber 210 from which the logs 150 are transferred out from the wood conditioning system for further processing. In other words, the wood material is prepared to the next process step then. The water used water in at least one of the cells 510D, 510E being the latest ones in the wood conditioning system is cooled a bit, but it may be input to previous cells as indicated with references 510B and 510C in FIG. 5. Further, the used water in cells 510B and 510C may still further be input to the first cell 510A in the wood conditioning system 200 to be first used with the logs 115 brought in the wood conditioning system 200. Finally, the circulated water may be returned to the scrubber for heating. In the described manner it is possible to circulate the water so that the logs 115 just brought in the wood conditioning system are conditioned with a steam being at the lowest temperature whereas the temperature of the steam increases gradually when the logs 115 are carried forward in the wood conditioning system. This kind of arrangement also minimizes the energy consumption of the system having a plurality of advantageous aspects in the wood product manufacturing process.

Figure 6:
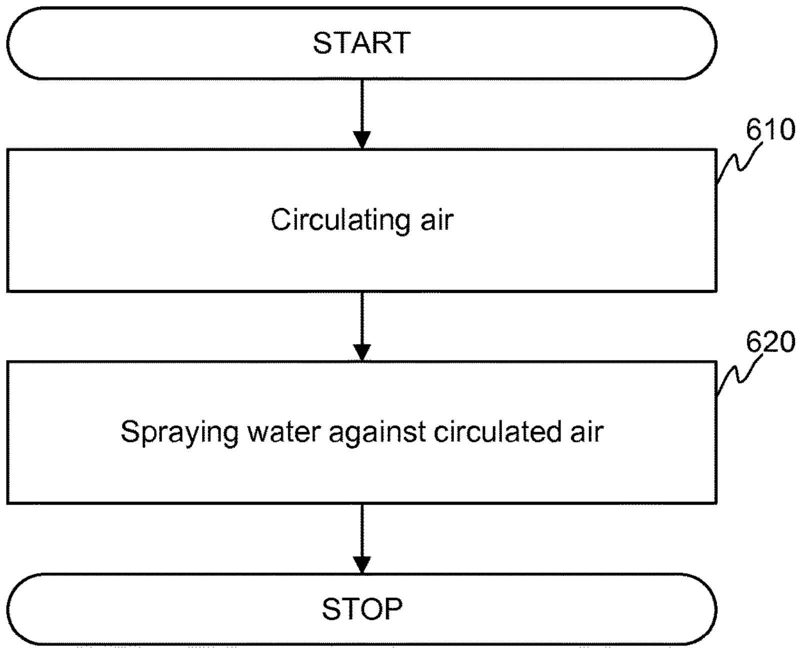
FIG. 6 illustrates schematically an example of a method according to an embodiment of the invention.

FIG. 6 schematically illustrates an example of a method for conditioning wood according to an embodiment of the present invention. The method may be applied in a wood conditioning system 200 which comprises a first chamber 210 and a second chamber 220. In the method air is circulated between the first chamber 210 and the second chamber 220 with at least one air conveyor device 250 and water is sprayed substantially against a direction of the circulated air with at least one device 240 arranged in the second chamber 220. In other words, in the method the air heated and humidified in the second chamber 220 may be conveyed to the first chamber 210 into which the wood material, such as logs, are brought in and wherein the heat and the humidity of the air is transferred at least in part in the wood material so as to achieve the conditioning. In an embodiment of the method the water may be sprayed at different levels in vertical direction of the second chamber 220 substantially against the direction of the circulated air. As described, at least part of the water may be received from a device external to the wood conditioning system 200. Moreover, the water received from the device external to the wood conditioning system 200 may be heated with a secondary energy obtained from another stage of a wood processing system. The method according to the invention may further comprise a step of separating at least part of water droplets from the circulated air with a droplet separator 270. The amount of separated water droplets may depend, at least in part, on a type of the droplet separator 270 used in the solution. As is clear from the description the method as described may be continuously applied when the wood conditioning is performed with the wood conditioning system 200 as described.

A further remark is herein given to the used terminology especially as it regards to that the water is sprayed substantially against the direction of the circulated air. Namely, this shall be understood also to cover any implementation in which the water and the air meet each other so that the described phenomenon occurs. In some implementation the water is sprayed against the direction of the circulated air, but the invention relates also to an implementation wherein the water is sprayed substantially to the same direction as the air circulates e.g. with a different speed. In such a case the air and the water meet so that they interact in the manner as described. Moreover, in some implementation of the present invention the system may comprise a plurality of sections into which different solutions for humidifying the air may be implemented. For example, in one section the water may be sprayed against the direction of the circulated air whereas in another section the water is sprayed in the same direction with the circulated air.

The description above provides a description of at least some aspects of the invention. It is clear that the system may comprise further elements in addition to ones described above. For example, the system is controlled with necessary control devices receiving input e.g. from a plurality of sensors. The control devices enable controlling the wood conditioning process optimally as well as any parameters and operations therein.

Generally speaking, as all the conditioning methods consume a lot of energy it is advantageous to develop solutions, like the present invention, in which at least a part of so-called secondary energy may be used for conditioning. This is possible e.g. in a veneer and ply production wherein a drying stage of the production generates an amount of the secondary energy in a form of hot water having a temperature less than the boiling point of the water at an atmospheric pressure. Hot water may also be available from other stages in the production. The present invention enables a utilization of the water binding the secondary energy in the temperature available from the production process making the present invention advantageous compared to known solutions.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A wood conditioning system comprising:

a first chamber;

a second chamber;

a droplet separator; and at least one air conveyor device for circulating air between the first chamber and the second chamber;

wherein the second chamber comprises at least one device for spraying water substantially against a direction of the circulated air flow; and wherein the droplet separator is positioned in the system so that the circulated air travels through the droplet separator when output from the second chamber towards the first chamber.

2. The wood conditioning system of claim 1, wherein the second chamber is configured so that the at least one device for spraying water is positioned so as to cause the sprayed water to drip down whereas the circulated air is conveyed substantially against a spray direction of the sprayed water.

3. The wood conditioning system of claim 1, wherein the at least one device for spraying water comprises a number of water nozzles.

4. The wood conditioning system of claim 1, wherein the at least one device for spraying water is configured to spray the water at different levels in the second chamber and against the direction of the circulated air flow.

5. The wood conditioning system of claim 1, wherein the water sprayed with the at least one device for spraying water is warmer than the air received in the second chamber from the first chamber.

6. The wood conditioning system of claim 1, wherein the at least one device for spraying water is configured to receive at least part of the water from an external device.

7. The wood conditioning system of claim 6, wherein the external device is a scrubber device.

8. The wood conditioning system of claim 1, wherein the at least one device for spraying water comprises a first device for spraying water and a second device for spraying water; wherein the second device for spraying water is configured to receive water output from the first device for spraying water; and wherein the first device for spraying water and the second device for spraying water are in the second chamber.

9. The wood conditioning system of claim 1, wherein the second chamber comprises filling material towards which at least a portion of the water is configured to be sprayed.

10. A method for conditioning wood with a wood conditioning system, the wood conditioning system comprising:

a first chamber;

a second chamber;

the method comprising:

circulating air between the first chamber and the second chamber with at least one air conveyor device; and spraying water against a direction of the circulated air flow with at least one device arranged in the second chamber;

wherein at least part of the water is received from an external device; and wherein the water received from the external device is heated with energy obtained from another stage of a wood processing system.

11. The method of claim 10, wherein the water is sprayed at different levels in the second chamber and against the direction of the circulated air flow.

12. The method of claim 10, further comprising separating at least part of water droplets from the circulated air with a droplet separator.

* * * * *